(12) United States Patent
Müller et al.

(10) Patent No.: US 6,548,561 B1
(45) Date of Patent: Apr. 15, 2003

(54) METHOD AND DEVICE FOR RECOVERING PURE PVC FROM PLASTIC WASTE CONTAINING PVC

(75) Inventors: Peter Müller, Karlsruhe (DE); Alexander Baron von Heyking, Frankenthal (DE); Jurgen Leitzke, Gouda (NL)

(73) Assignee: P-TEC GmbH Polymertechnologie, Karlsruhe (DE)

( * ) Notice: Subject to any disclaimer, the term of this patent is extended or adjusted under 35 U.S.C. 154(b) by 0 days.

(21) Appl. No.: 09/762,040

(22) PCT Filed: Aug. 19, 1999

(86) PCT No.: PCT/EP99/06088

§ 371 (c)(1), (2), (4) Date: Feb. 1, 2001

(87) PCT Pub. No.: WO00/10787

PCT Pub. Date: Mar. 2, 2000

(30) Foreign Application Priority Data

Aug. 21, 1998 (DE) .......................... 198 38 141

(51) Int. Cl.⁷ ................................. C08J 11/04
(52) U.S. Cl. .................... 521/46.5; 264/37.1; 521/45.5
(58) Field of Search ............................ 521/40.5, 45.5, 521/46.5; 264/37.1, 37.3, 39, 41

(56) References Cited

U.S. PATENT DOCUMENTS 5,674,914 A * 10/1997 Abe et al. .................. 521/46.5
6,172,125 B1 * 1/2001 Vandenhende ............. 521/46.5
6,335,376 B1 * 1/2002 Allen, III et al. .......... 521/40.5

FOREIGN PATENT DOCUMENTS

| DE | 8 92 676 | 10/1953 |
| DE | 19 63 148 | 7/1970 |
| DE | 23 28 448 | 2/1975 |
| DE | 29 00 666 | 7/1980 |
| DE | 33 40 273 | 5/1985 |
| DE | 41 06 812 | 9/1992 |
| DE | 43 13 007 | 10/1994 |
| DE | 44 41 229 | 8/1995 |

OTHER PUBLICATIONS

Djawadi et al., "Sortenreine PVC–Abfälle aufbereiten" Kunststoffe 84 (1994) 2, p 121 ff.

* cited by examiner

Primary Examiner—Edward J. Cain
Assistant Examiner—Katarzyna Wyrozebski-Lee
(74) Attorney, Agent, or Firm—Paul Vincent

(57) ABSTRACT

In a method for recovering pure PVC from pre-disintegrated PVC containing substance mixtures, the substance mixture is soaked in a swelling agent for PVC, is supplied under pressure into an arrangement of at least two sequential hydrocyclones, wherein, in the first hydrocyclone, a heavy fraction of impurities is separated in the sink flow and a light fraction of swelled PVC particles and light impurities and plastic particles are separated in the rising flow, wherein the pre-cleaned light fraction is sorted and the particle fraction comprising the swelled PVC particles and smaller plastic particles is fed to the second hydrocyclone in which the PVC particles are separated in the sink flow. The invention also describes a device for carrying out the method.

35 Claims, 4 Drawing Sheets

METHOD AND DEVICE FOR RECOVERING PURE PVC FROM PLASTIC WASTE CONTAINING PVC

BACKGROUND OF THE INVENTION

The invention concerns of method directed towards the features in the preamble of the independent method claim and a device directed towards the features in the preamble of the independent device claim.

Polyvinylchloride (PVC) is used in a plurality of applications as insulation material for cables, as protective and decorating material, for pipe construction, in plastic compounds for floor coverings etc. To conserve natural resources and protect the environment, the recovery of plastic materials, including in particular PVC, has become more and more important. This is also increasingly the case for material compounds, such as electric cables whose additional components can also be recycled.

Various methods for processing electric cables having PVC insulation are known (DE 33 40 273 A1, DE 19 63 148). While the heavy fraction composed of different metal components can be separated relatively easily using physical methods due to the specific properties of the metals, the light fraction composed of different plastic components, such as PVC, PE (polyethylene), PP (polypropylene) etc. is difficult to separate by physical methods due to the plurality of different materials having similar physical properties. DE 44 41 229 C2 describes a method and a device for continuous processing of plastic coated cable remains and cable waste, wherein the metal core of the cable and also the PVC insulation material shall be recovered in pure form. This method is suited exclusively for separating PVC and metal. Other plastic insulation must be manually sorted in an expensive preparation station. Practice has further shown that, in the known system, the swelling PVC particles agglomerate to form a tough, thick sludge which precludes both separation of the PVC particles as well as desorption and recovery of the swelling agent.

As mentioned above, these recycling processes produce a plastic mixture, the light fraction of which contains further impurities, e.g. metallic remnants, sand, textiles and/or paper. Since, even with the addition of thermal stabilizers, PVC tends to thermally degrade when heated to more than 180° C. thereby separating toxic chlorine and irritating hydrogen chloride, thermal utilization of the plastic mixture or cracking to obtain a crude oil-like basic material are not possible. Conversion of the plastic mixture into a plastic state and subsequent extrusion, which has to be effected at approximately 150° C., is not possible, in particular when residual impurities of heavy metals such as copper are present since, at these temperatures, polychlorinated dioxins and furanes form under the catalytic influence of the heavy metals when a chlorine donator (PVC) is present.

According to prior art, the only processing options for such light fractions composed of different plastic materials is the so-called down-cycling into products of poor material quality, or disposal.

DE 41 06 812 A1 describes a method for the recycling of mixed plastic refuse, wherein layered plastic composites are disintegrated, the composite pieces decomposed into particles of a given material and the particles of differing materials subsequently separated into pure groups of a given material each. The disintegration of the composite pieces into particles of a given material is effected with mechanical shearing forces. The separation into pure groups of particles is effected by dispersing the particles in water and separating them in a plurality of hydrocyclone stages. Particularly for the case of plastic refuse containing PVC, same is disadvantageously poorly separable from other plastics of similar density despite the use of a plurality of hydrocyclone stages, since PVC, as is the case for most other plastics, does not swell in water and is therefore discharged in both the rising and sinking flow, even in the last hydrocyclone stage.

DE 2 900 666 A1 also discloses a method for separating mixed plastic refuse, wherein the refuse is disintegrated, suspended in a carrier liquid (water) and separated in sequential hydrocyclones. This method is also incapable of separating PVC from plastics of similar density.

DE 43 13 007 A1 discloses a method for separating a plastic from a support material. The plastic is separated from the support material through the use of a suitable solvent in which the plastic swells but the support material does not.

It is the underlying purpose of the invention to recover this PVC in pure form from plastic waste having a particularly high PVC content.

SUMMARY OF THE INVENTION

In accordance with the invention, this object is achieved by a method in that the soaked substance mixture is transported under pressure into an arrangement of at least two hydrocyclones which are connected in series. The first hydrocyclone separates a heavy fraction of impurities such as sand and metal particles and heavy plastic particles in the sink flow, and a light fraction of swelled PVC particles and light impurities and plastic particles in the rising flow. Subsequently, the pre-cleaned light fraction is sorted and the particle fraction comprising the swelled PVC particles and smaller plastic particles is fed to the second hydrocyclone in which the PVC particles are separated in the sink flow.

With respect to the hardware side of the system, the inventive object is achieved by a device, wherein the arrangement of devices for separating the swelled PVC comprises at least two sequential hydrocyclones and at least one sorter, disposed between the upper outlet of the first hydrocyclone and the second hydrocyclone, wherein at least one pressure transporter is disposed after the swelling container for soaking the PVC and the first hydrocyclone to transport the substance mixture.

Advantageous embodiments of the invention are characterized in the dependent claims whose features are explained in the description of the drawings.

The invention offers the substantial improvement that, after carrying out the steps explained below by means of a flow diagram, the PVC is present in pure form. The mixture consisting of further plastic components from which the PVC has been separated, can be further processed in a known fashion, e.g. thermally utilized, extruded or poured. The separated PVC has properties nearly identical to those of new material. Certain material properties, such as plasticity, flowability, tensile strength etc. of the PVC, which in its pure form is extremely brittle, can be influenced through the addition of softeners such as phthalic or terephthalic esters, alkylphosphates or phosphinoxides which partly dissolve in the swelling agent and/or solvent and are re-supplied to the PVC, separated from the other plastic materials. Advantageously, other impurities in the plastic mixture used such as metals, sand, textiles or paper are also separated from the PVC. The PVC thereby no longer contains, in particular, metallic remnants which would disturb further processing. An important feature of the inventive method is the constant shearing of the substance mixture and of the PVC enriched fractions successively separated therefrom in the simultaneous presence of the swelling agent thereby effecting constant core size reduction of the swelling particles while preventing their agglomeration.

The inventive device is sealed off in a gas-tight fashion such that swelling agent vapors cannot escape into the atmosphere but rather are almost completely recovered and recycled in the process. The swelling agent is preferably methylene chloride (dichloromethane, $CH_2Cl_2$) which effects rapid swelling of PVC without changing its chemical structure, while the other plastic components such as polyamides, polyadditions, polyolefines (PE, PP etc.) or PTFE do not or only slightly swell in this medium. The use of methylene chloride for separating PVC insulation from electric cables via mechanical agitation, such as vibrations, stirring, knocking or grinding effects is known per se from DE 23 28 448 A1.

The invention is explained in more detail below by means of a preferred embodiment and with reference to the drawing.

DESCRIPTION OF THE PREFERRED EMBODIMENT

Figure 1:
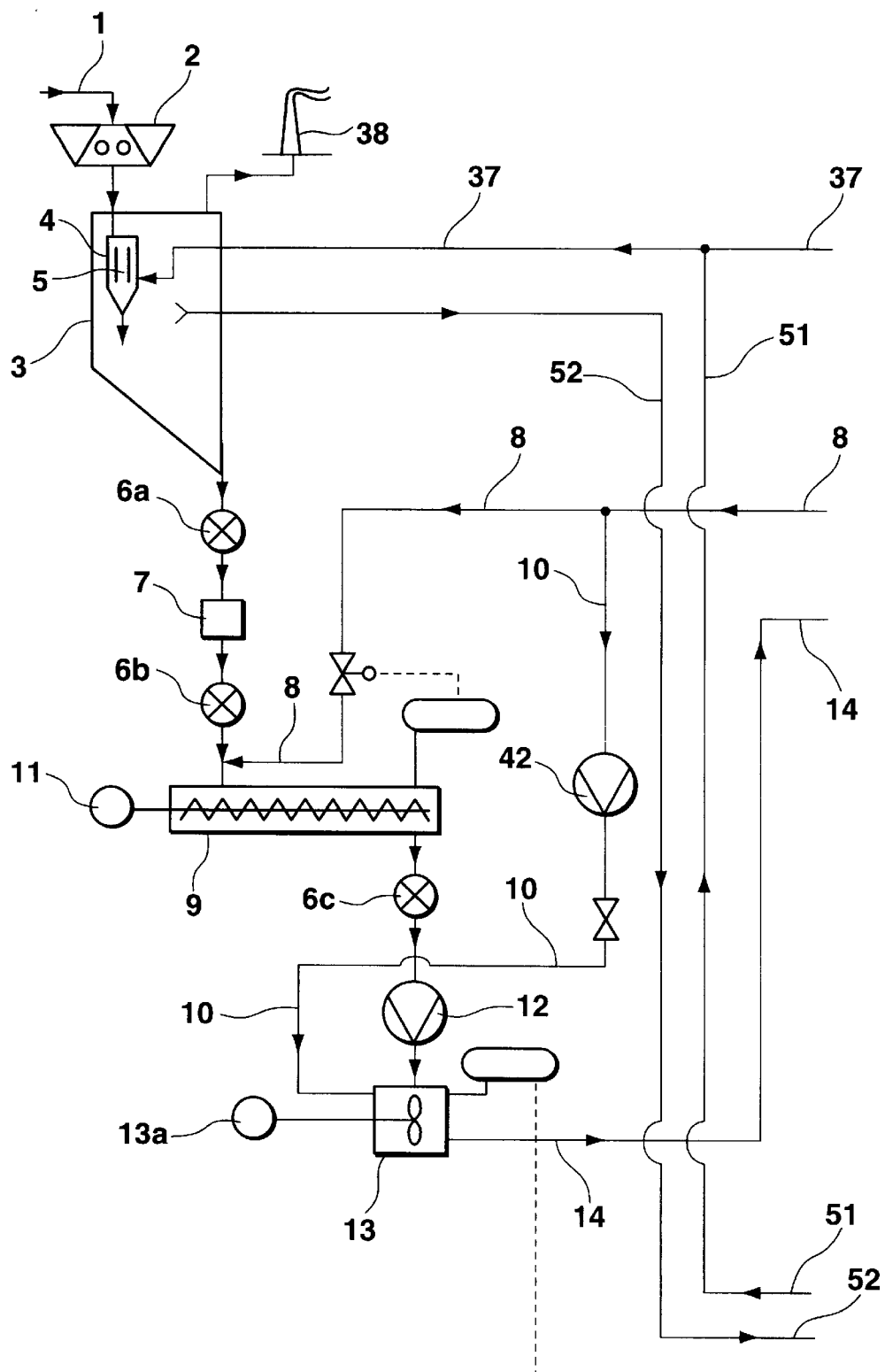
FIG. 1 shows a first portion of a flow diagram for carrying out the method and device of the invention.

The starting PVC material containing plastic waste, accompanying impurities, such as metals, sand, textiles or paper is supplied via feed belts 1 to a shredder 2 which mechanically disintegrates the starting material to the length required for processing. The shredder 2 may be e.g. a cone crusher or conical cylinder crusher. The previously disintegrated substance mixture is supplied to a reactor 4 disposed in a closed feed container 3 and passes through the filling layer 5 of the reactor 4 into the feed container 3. The function of the reactor 4 is described below. The disintegrated feed is transported from the feed container 3 by means of a pressure-tight star feeder 6a and into a buffer container 7 and conveyed from there by means of a pressure-tight star feeder 6b to a swelling container 9 to which the swelling agent, preferably methylene chloride is also supplied via the line 8. The star feeders 6a, 6b not only serve for transporting the substance mixture but also act as a gas cutoff between the upstream and the downstream system components. The PVC contained in the previously disintegrated substance mixture is swelled in the swelling container 9.

In the embodiment shown, the swelling container 9 is formed as feed screw which is driven by a controllable motor 11 such that the swelling time of the PVC is continuously controlled through the rotational speed of the feed screw. The swelling container 9 can e.g. be a discontinuously operated stir container reactor. In this case two stir container reactors are preferably provided in parallel.

The star feeder 6c, connected after the swelling container 9, transfers the swelled feed to a pressure transporter, preferably a pump 12, e.g. a thick matter pump, centrifugal pump or the like. The pump 12 transports the substance mixture, mixed with methylene chloride, under continuous application of shearing forces and into a mixing container 13. The pump 12 thereby establishes a pressure required for transport of the substance mixture. This pressure depends on the configuration of the hydrocyclone arrangement (described below) and is not more than 1.5 bar, preferably not more than 1 bar. Alternatively or additionally, an injection device, supplied with the swelling agent, is provided as pressure transporter, wherein the substance mixture is both acted upon by pressure through the permanent application of shearing forces, while, at the same time, being thinned to reduce its viscosity.

The mixing container 13 comprises a means for mechanically disintegrating the swelled PVC in the form of a high speed stirring device 13a which mechanically decomposes the PVC through shearing action in the flow produced by the stirring device 13a to grain sizes of less than approximately 1 mm while the shape and size of other plastic components which have not swelled or which have slightly swelled in the methylene chloride remain largely unchanged.

The pump 42 supplies a controllable volume flow of solvent and/or swelling agent, in particular methylene chloride, via the line 10 into the mixing container 13 to increase the flowability of the substance mixture.

Figure 2:
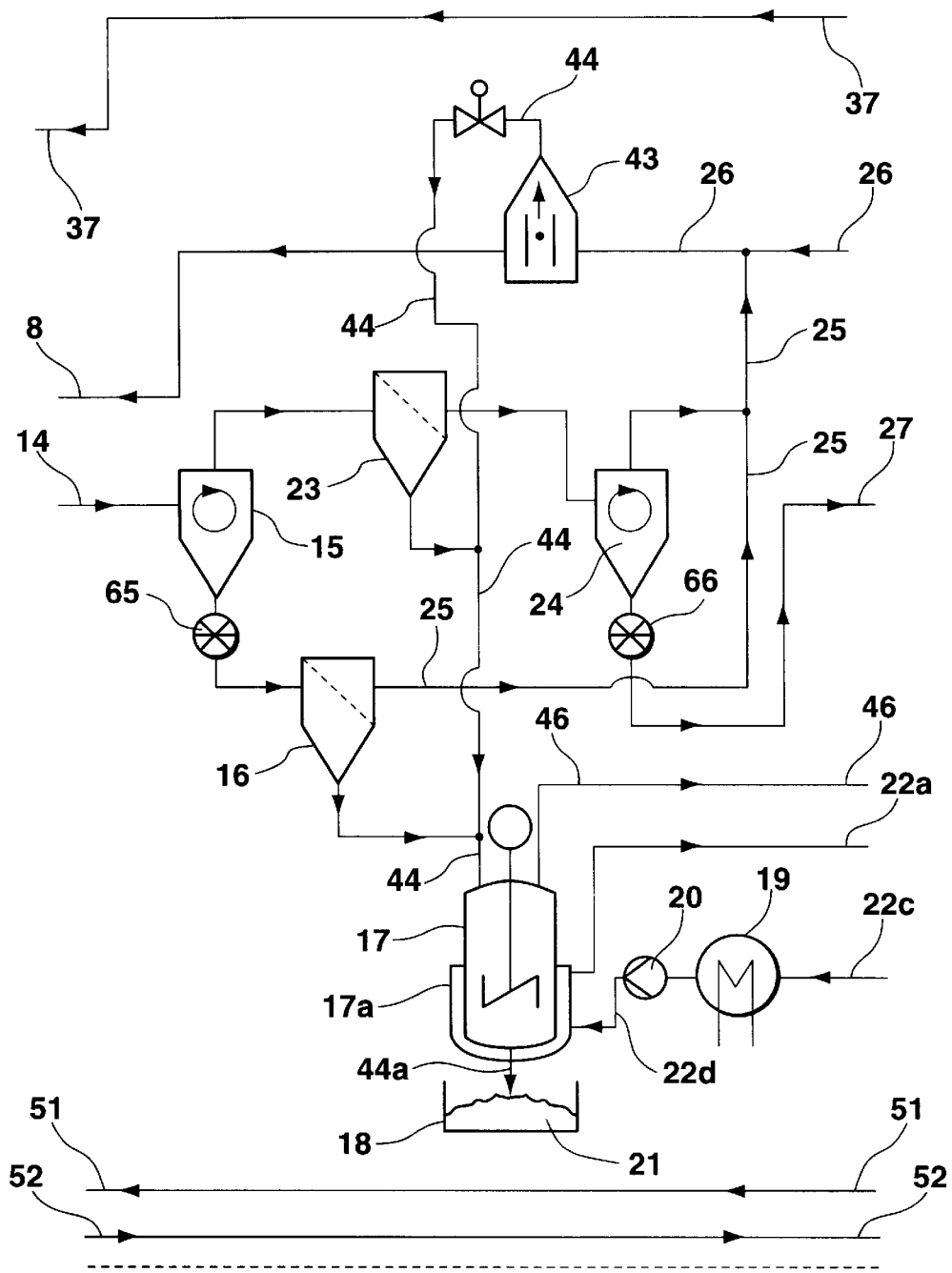
FIG. 2 shows a second portion of a flow diagram for carrying out the method and device of the invention.

The pressurized substance mixture mixed with methylene chloride is supplied via the line 14 into a first hydrocyclone 15 (FIG. 2) of an inventive hydrocyclone arrangement, which is operated in such a manner that all heavy and coarse-grained impurities, e.g. sand and metal particles which are larger than e.g. 50 $\mu$m, and all plastic particles which have not swelled or which have only slightly swelled and which are smaller than approximately 1 mm and whose density is larger than the density of the swelled PVC are fed, as a heavy fraction, via the downward flow of the hydrocyclone 15 to a star feeder 65. The fraction separated in the sink flow of the hydrocyclone 15 is continuously fed from the hydrocyclone 15 through the star feeder 65 which preferably has rotational speed control. The star feeder 63 also prevents a pressure drop at the discharge of the hydrocyclone to largely prevent a central back-flow in the hydrocyclone 15. The solid particles are thus layered, depending on their size and density, in equidistant regions along the conical, downwardly tapering walls of the hydrocyclone 15. The rotational speed of the star feeder 65 thereby permits adjustment of both the amount as well as the particle size or density of the fraction separated in the sink flow of the hydrocyclone 15. Moreover, a hydrocyclone arrangement of this kind requires a relatively small supply pressure to thereby reduce the operational costs of the inventive device. In order not to impair the working pressure in the region of the sink flow-sided discharge of the hydrocyclone 15, the star feeder 65 is preferably completely flooded with swelling agent.

The heavy fraction separated in the downward flow of the hydrocyclone 15, is transferred by the star feeder 65 to a sorter 16 which may be designed e.g. as fine mesh oscillating screen. The heavy fraction separated in the downward flow of the hydrocyclone 15 is separated from the remaining swelling agent and discharged to the line 44 while the swelling agent itself is re-supplied via the line 25. Alternatively or additionally, the heavy fraction can be floated or sorted in a different fashion.

The swelled PVC particles exit, together with the plastic particles which have not swelled or which have only slightly swelled, from the hydrocyclone 15 as a light fraction via the upward flow and reach a sorter 23. If the sorter 23 is also designed as an oscillating screen, the mesh width of this oscillating screen 23 is preferably dimensioned such that particles which are smaller than approximately 1 mm pass through the screen whereas particles which are larger than approximately 1 mm, e.g. paper or textiles, are separated as screened residue and are likewise supplied to the line 44. The same is the case e.g. with flotation.

The material passing through the oscillating screen 23 contains swelled PVC particles and also buoyant plastic particles smaller than approximately 1 mm. They are transported, together with the swelling agent, into a second hydrocyclone 24 having a star feeder 66 downstream of the sink flow-sided discharge. The hydrocyclone 24 is preferably operated at a considerably higher rotational speed than the hydrocyclone 15. Here, the swelled PVC particles are separated in the downward flow and reach the line 27 via the star feeder 66. Buoyant particles smaller than approximately 1 mm, e.g. of plastic material, paper or textiles are transported, together with the swelling agent, in the upward flow of the hydrocyclone 24. The different rotational speeds of the hydrocyclones 15, 24 can be regulated via the pressure difference between inlet and rising flow-sided outlet, wherein e.g. valves or throttle sections may be provided. Additionally, a further pressure transporter may be provided between the hydrocyclones 15 and 24 for generating a higher pressure difference. In an arrangement consisting of two hydrocyclones 15, 24, each having a downstream star feeder 65, 66 for separating PVC, it is generally sufficient to use only one pressure transporter 12. It is of course also possible to dispose more than two hydrocyclones in series.

The buoyant particles separated in the upward flow of the hydrocyclone 24 are transported together with the swelling agent, via the lines 25 and 26, to a separator 43 in which the particles are separated and again guided into the line 44. The line 44 leads to a heated drier 17 wherein absorbed swelling agent evaporates and is guided back into the process via the line 46. The drier 17 comprises e.g. a heating jacket 17a through which a circulating heating medium cyclically flows. The heating circuit comprises the heat exchanger 19, the circulating pump 20 and the lines 22a–d. The dried and desorbed product 21 leaves the drier 17 via the line 44a, which may be provided with a star feeder (not shown) for active transport, and joins the heavy fraction in the collector 18. The PVC-free product 21 which may contain impurities such as sand, metal, paper or textiles, depending on the initial bulk material, may be further processed in a conventional fashion.

Figure 3:
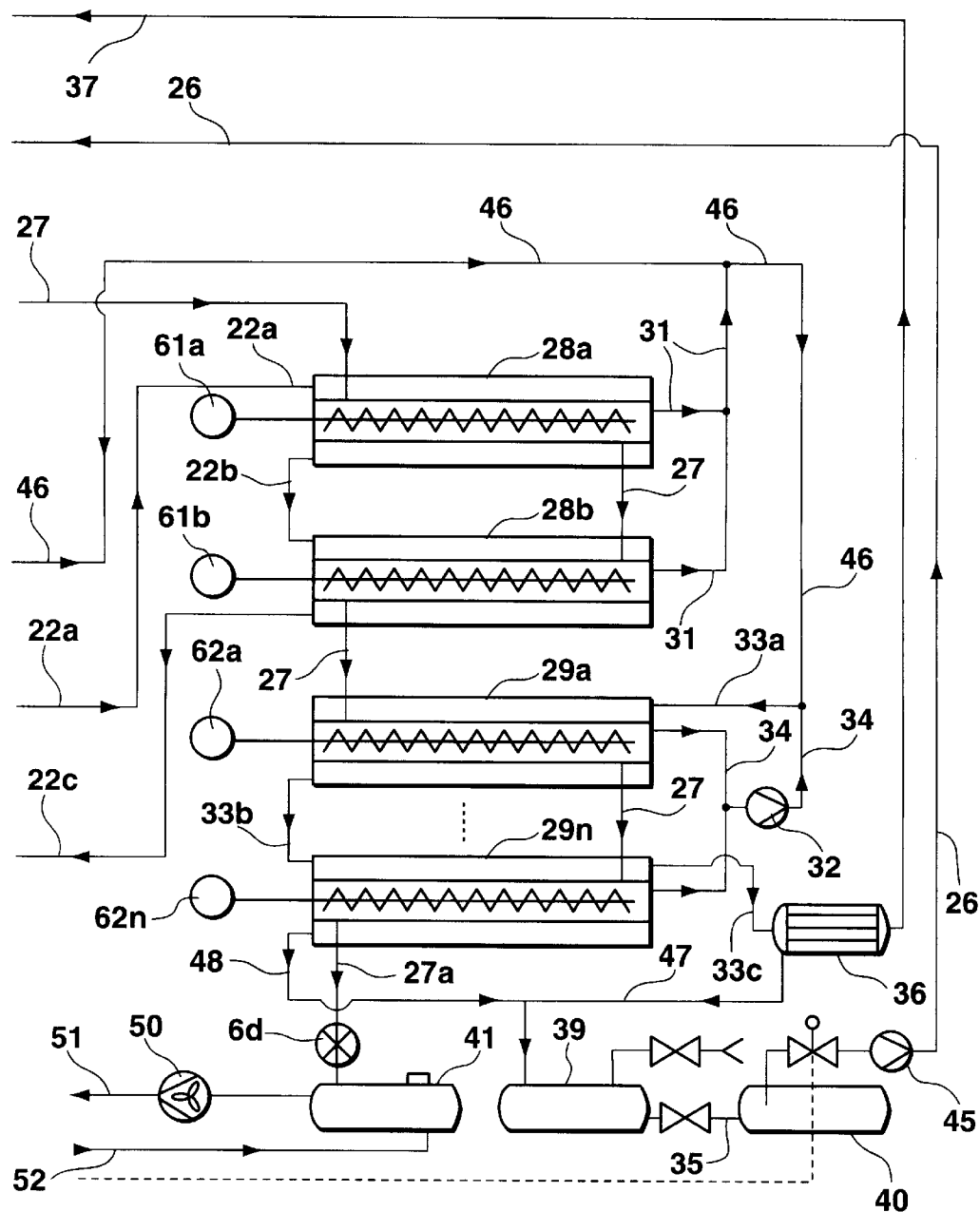
FIG. 3 shows a third portion of a flow diagram for carrying out the method and device of the invention.

The PVC separated in the downward flow of the hydrocyclone 24 which has slurry properties after swelling can be supplied via the line 27 to an arrangement of sequentially connected dry transport screws 28a, 28b to 29a–n (shown in FIG. 3) of which at least one—two (28a and 28b) in the embodiment shown—comprises a heating jacket for evaporating or desorbing the swelling agent. The dry transport screws are integrated via the lines 22a, 22b, 22c into the heating cycle of the drier 21, wherein heat transfer is effected through the heat exchanger 19. The evaporated or desorbed swelling agent is returned to the process via the lines 31 or 46. After exit from the heated dry transport screw 28b, the PVC which still contains swelling agent remnants, is transported via the line 27 into a cascade of dry transport screws 29a–n which are evacuated by a vacuum pump 32 for complete evaporation or desorption of the swelling agent. The dwell time of the PVC having the swelling agent in the dry transport screws 28a, 28b, 29a–n can be varied via their rotational speeds, e.g. through controllable motors 61a, 61b or 62a–n.

The gaseous swelling agent removed in this fashion is combined in the line 46 with the gaseous swelling agent removed from the mixing container 17 and is supplied via the lines 33a, 33b to the heating jacket of the dry transport screws 29a–n. The evaporating temperature of the methylene chloride in the dry transport screws 29a–n is approximately 10° C. at the partial pressure prevailing there. The methylene chloride is condensed in the heating jacket of the dry transport screws 29a–n. Alternatively or additionally, other containers may also be provided for evaporating or desorbing the swelling agent, e.g. distilling columns, rectifying units etc.

The swelling agent vapor not yet condensed in the heating jacket of the last evacuated dry transport screw 29n is guided via the line 33c into a condenser 36 which is e.g. air or water cooled. The condensed material passes via the line 47, together with the condensed material from the heating jacket of the last evacuated dry transport screw 29n (line 48), into a swelling agent tank 39. To always ensure a sufficient amount of swelling agent, e.g. two swelling agent tanks 39, 40 are provided which are interconnected via a compensation line 35. A level-regulated feed pump 45 always supplies the required amount of swelling agent via the line 26 into the separator 43 (FIG. 2) or via the line 8 into the transport screw 9 (FIG. 1). The dry transport screws 29a–n which are under partial pressure and whose heating jacket serves as a condenser for the gaseous swelling agent, serve for heat recovering and thus reduce operational costs.

The additives contained in the PVC charge and in particular those dissolved in methylene chloride during swelling in the transport screw 9 are separated during evaporation of the swelling agent in the dry transport screws 28a, 28b, 29a–n and returned to the recovered PVC such that its properties correspond to the properties of the PVC charge. These additives are mainly softeners, e.g. not easily volatized components having high boiling temperatures such as phthalates or terephthalates, alkylphosphates or phosphinoxides. These components do not volatilize during removal of the swelling agent, neither in the actively heated dry transport screws 28a, 28b nor in the evacuated dry transport screws 29a–n such that the softeners are dissolved again in the PVC to prevent concentration thereof in the swelling agent circuit. The dried PVC is preferably discharged, via a pressure-tight star feeder 6d, to a storage container 41.

The storage container 41 may have active internal ventilation provided by a blower 50 to optionally desorb swelling agent still contained in the PVC. The feed air is preferably withdrawn from the feed container 3 via the line 52 and guided via the line 51 to the line 37 which returns the exhaust air, charged with desorbed swelling agent, together with the uncondensed swelling agent vapor in the condenser 36, into the feed container 3. Therein, the exhaust air charged with small amounts of gaseous swelling agent is fed from the lines 37 and 51 into the reactor 4 which is disposed below the inlet of the feed container 3 in such a manner that it is constantly filled with fresh starting products which adsorb the swelling agent remnants in the filling layer 5. The reactor 4 may e.g. be a swirling bed or stationary bed reactor. It may be disposed in the closed feed container 3 or can constitute a closed feed container. The exhaust air from the filling layer 5 and the feed container 3 is discharged via the chimney 38. It may contain slight traces of foreign gases of no environmental importance.

Figure 4:
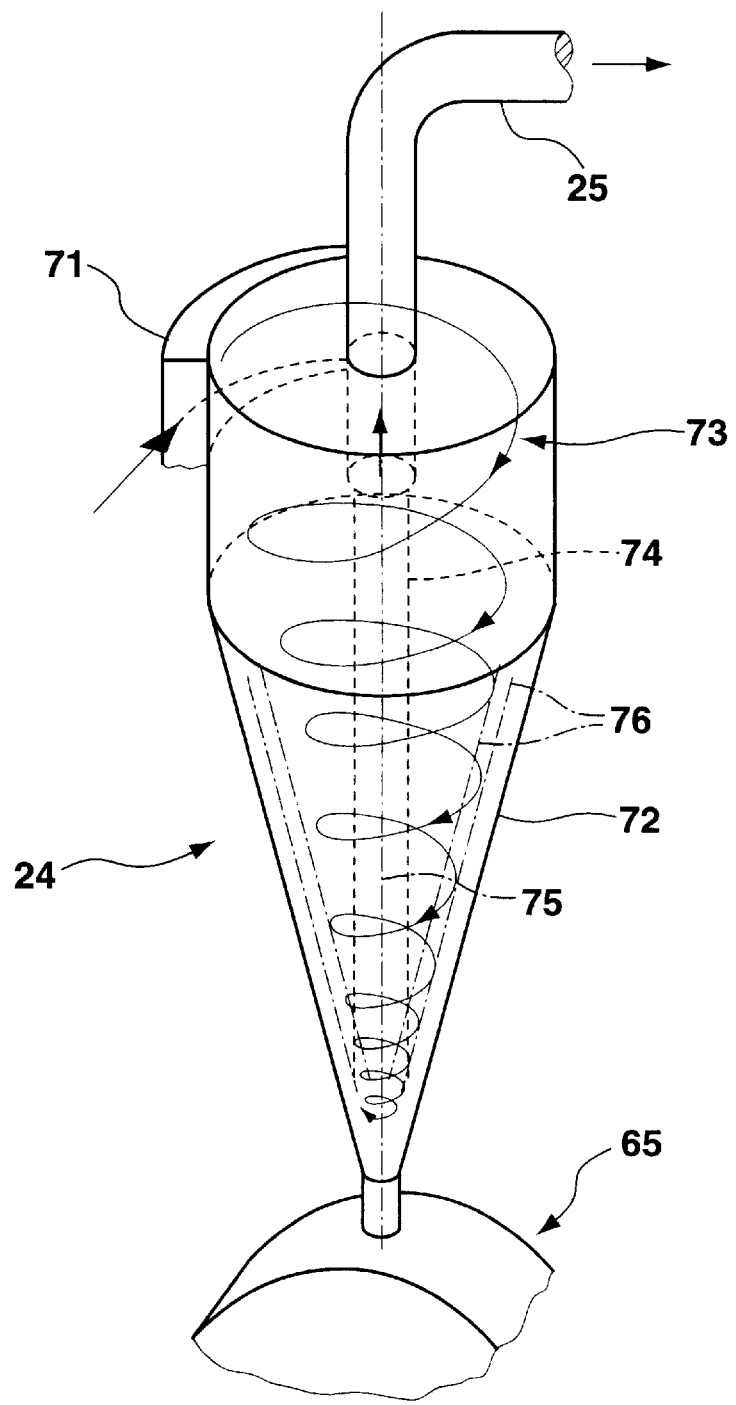
FIG. 4 shows a schematic view of a hydrocyclone utilized in the system.

FIG. 4 shows, by way of example, one hydrocyclone 24 of the inventive hydrocyclone arrangement for separating the PVC. The hydrocyclone 24 comprises an approximately tangential inlet 71 via which the swelled PVC particles are introduced under pressure together with buoyant plastic particles and swelling agent. The tangential feed and the pressure generated e.g. by the pump 12 (see FIG. 1) create turbulent flow 73 with high rotational speed which is further increased by the wall 72 extending conically in a downward direction. An under-pressure prevails in the turbulence center 74, along the longitudinal central axis 75 of the hydrocyclone 24. The PVC particles are accelerated towards the walls 72 by the centrifugal forces and are transported by the rotational speed of the turbulent flow 73 along a guided spiral track, towards the sink flow-sided outlet 27. The buoyant plastic particles with a density less than that of the swelling agent, accumulate in the region of the turbulent center 75 and are discharged out of the hydrocyclone 24 via the outlet 25, formed as dip pipe. At the sink flow-sided outlet of the hydrocyclone 24, the PVC particles are continuously discharged via the star feeder 65. The star feeder 65 has rotational speed control and is preferably completely flooded with the swelling agent to prevent a pressure drop at the sink flow-sided outlet and thereby leading to the formation of layers 76 of the particles, in dependence on their size and density, wherein the discharged solid volume is replaced by the corresponding volume of swelling agent. In this fashion, the particle size and density of the fraction separated in the sink flow of the hydrocyclone 24 is regulated through control of the rotational speed of the star feeder 65.

We claim:

1. A method for recovering pure polyvinylchloride (PVC) from substance mixtures containing previously disintegrated PVC and at least one of further plastic waste, impurities, particles of sand, metal, paper and textiles, the method comprising the steps of:
   a) soaking the substance mixture in a swelling agent for PVC;
   b) mechanically disintegrating the swelled PVC;
   c) feeding the soaked substance mixture under pressure into a first hydrocyclone;
   d) separating heavy impurities in a sink flow of said first hydrocyclone;
   e) separating a light fraction of swelled PVC particles, light impurities and plastic particles in a rising flow of said first hydrocyclone;
   f) sorting said separated light fraction according to particle size;
   g) feeding a smaller particle fraction, separated in step f) and containing swelled PVC particles and smaller plastic particles, into a second hydrocyclone; and
   h) separating PVC particles in a sink flow of said second hydrocyclone, wherein all method steps are carried out in a closed system.

2. The method of claim 1, further comprising continuously discharging a fraction separated in said sink flow of at least one of said first and said second hydrocyclone using a first star feeder.

3. The method of claim 2, further comprising adjusting a rotational speed of said first star feeder to control discharge of said fraction separated in said sink flow.

4. The method of claim 2, further comprising flooding said first star feeder with swelling agent.

5. The method of claim 1, wherein a heavy fraction in at least one of said first and said second hydrocyclone is transported on a guided spiral path towards a sink flow-sided discharge thereof.

6. The method of claim 1, further comprising generating a feed pressure at an inlet of at least said first hydrocyclone.

7. The method of claim 6, wherein said feed pressure is generated through pressurized input of swelling agent at a first hydrocyclone supply.

8. The method of claim 6, wherein said feed pressure is generated by at least one of a pump and a thick matter pump.

9. The method of claim 6, wherein said feed pressure is not more than 1 bar.

10. The method of claim 1, wherein said first hydrocyclone is operated at a first rotational speed differing from a second rotation speed at which said second hydrocyclone is operated.

11. The method of claim 1, further comprising controlling a swelling time of PVC in the substance mixture.

12. The method of claim 1, further comprising re-supplying, to separated pure PVC, additives contained in the PVC of the substance mixture which partially dissolve in the swelling agent through at least one of evaporation and desorption of the swelling agent through diffusion during drying.

13. The method of claim 1, further comprising depositing, in a gas-tight manner, dried, pure PVC in a closed collector and ventilating said closed collector in a closed cycle for complete desorption of the swelling agent.

14. The method of claim 1, further comprising, prior to step a), feeding a mechanically pre-disintegrated substance mixture to a reactor having a filling layer supplied with exhaust air containing gaseous swelling agent remnants from subsequent processing steps, wherein said gaseous swelling agent contained in said exhaust air is adsorbed in the pre-disintegrated substance mixture in said filling layer of said reactor.

15. The method of claim 14, wherein said reactor is one of a closed feed container and disposed in a closed feed container.

16. The method of claim 15, further comprising transporting swelling agent-free exhaust from said closed feed container to an exhaust gas chimney.

17. The method of claim 1, further comprising transporting, using at least one gas-tight second star feeder, pre-disintegrated substance mixture from one of a reactor and a feed container to at least one swelling container.

18. The method of claim 17, further comprising transporting pre-disintegrated substance mixture to said swelling container in a gas-tight manner via a lock arrangement comprising said second star feeder, a third pressure-tight star feeder and a container disposed between said second and said third star feeder.

19. The method of claim 1, wherein step a) comprises the step of feeding the substance mixture to a swelling container and wherein step b) follows step a).

20. The method of claim 1, wherein methylene chloride (dichloromethane $CH_2Cl_2$) is used as a swelling agent.

21. The method of claim 1, wherein the method is carried out continuously.

22. A device for carrying out the method of claim 1, the device comprising:
   at least one swelling container for receiving the substance mixture and the swelling agent for soaking the PVC;
   a device for mechanically disintegrating the swelled PVC;
   a first hydrocyclone for separating the swelled PCT;
   a second hydrocyclone disposed downstream of said first hydrocyclone for further separation of the swelled PCT;
   at least one sorter disposed between said first and said second hydrocyclone;
   at least one pressure transporter disposed downstream of said swelling container and downstream of said first hydrocyclone to transport the substance mixture; and
   devices for separating the swelling agent from the separated pure PVC, wherein all swelling agent-carrying parts form a gas-tight system.

23. The device of claim 22, wherein a star feeder is disposed at a sink flow-sided discharge of at least one of said first and said second hydrocyclone for transporting a fraction separated in sink flow.

24. The device of claim 23, wherein a rotational speed of said star feeder can be controlled.

25. The device of claim 23, wherein said star feeder is flooded with swelling agent.

26. The device of claim 22, wherein said at least one pressure transporter is disposed after said swelling container and has a maximum supply pressure of 1 bar.

27. The device of claim 26, wherein said at least one pressure transporter is an injection device fed with swelling agent.

28. The device of claim 26, wherein said at least one pressure transporter is one of a pump and a thick matter pump.

29. The device of claim 22, wherein said first hydrocyclone has a first adjusted rotational speed differing from a second adjusted rotational speed of said second hydrocyclone.

30. The device of claim 22, further comprising means for at least one of evaporating and desorbing swelling agent and means for returning at least one of additives and softeners into separated PVC.

31. The device of claim 22, further comprising a closed collector for depositing separated pure PVC and means for active internal ventilation of said closed collector for complete desorption of the swelling agent.

32. The device of claim 22, further comprising a reactor for receiving pre-disintegrated substance mixture, said reactor having a filling layer into which exhaust air containing swelling agent can be introduced from downstream system components.

33. The device of claim 32, wherein said reactor is one of a closed feed container and disposed in a closed feed container.

34. The device of claim 22, further comprising at least one pressure-tight star feeder for feeding mechanically pre-disintegrated substance mixture into said swelling container.

35. The device of claim 34, further comprising lock means having two pressure-tight star feeders and a buffer container disposed therebetween, said lock means for gas-tight feeding of the substance mixture into subsequent system components.

* * * * *